US008596297B2

United States Patent
Peattie et al.

(10) Patent No.: US 8,596,297 B2
(45) Date of Patent: Dec. 3, 2013

(54) DRY-BREAK FUEL RECEIVER WITH INTEGRAL BACK-FLOW PREVENTION

(75) Inventors: Adam Peattie, Charlestown (AU); Joshua Jeffress, Whitebridge (AU)

(73) Assignee: Walnab Pty Limited (AU)

( * ) Notice: Subject to any disclaimer, the term of this patent is extended or adjusted under 35 U.S.C. 154(b) by 431 days.

(21) Appl. No.: 12/675,628

(22) PCT Filed: Aug. 31, 2007

(86) PCT No.: PCT/AU2007/001271
§ 371 (c)(1),
(2), (4) Date: Jul. 28, 2011

(87) PCT Pub. No.: WO2009/026607
PCT Pub. Date: Mar. 5, 2009

(65) Prior Publication Data
US 2011/0272046 A1    Nov. 10, 2011

(51) Int. Cl.
*F16L 37/30*    (2006.01)
(52) U.S. Cl.
USPC .................................. 137/614.05; 137/614.03
(58) Field of Classification Search
USPC .................... 137/494, 495, 496, 614, 614.03, 137/614.05, 614.06; 141/198
See application file for complete search history.

(56) References Cited

U.S. PATENT DOCUMENTS

| 2,509,444 | A | * | 5/1950 | Mitchell | 137/614.04 |
|---|---|---|---|---|---|
| 3,464,436 | A | * | 9/1969 | Bruning | 137/237 |
| 3,537,476 | A | * | 11/1970 | Evans | 137/614 |
| 3,674,061 | A | * | 7/1972 | Calisher et al. | 141/198 |
| 4,373,551 | A | * | 2/1983 | Shindelar | 137/614.06 |
| 5,813,432 | A | | 9/1998 | Elsdon et al. | |
| 6,056,010 | A | * | 5/2000 | Wells | 137/614.06 |
| 6,382,251 | B1 | * | 5/2002 | Hopson | 137/614.05 |
| 6,672,327 | B1 | | 1/2004 | Krywitsky | |
| 7,591,291 | B2 | | 9/2009 | Mackey et al. | |
| 7,757,709 | B2 | * | 7/2010 | Cortez | 137/393 |
| 2008/0202600 | A1 | * | 8/2008 | Peattie et al. | 137/429 |

OTHER PUBLICATIONS

International Search Report for PCT/AU2007/001271 dated Oct. 19, 2007.

* cited by examiner

*Primary Examiner* — Kevin Lee
*Assistant Examiner* — Daphne M Barry
(74) *Attorney, Agent, or Firm* — Levenfeld Pearlstein, LLC

(57) ABSTRACT

The present invention relates broadly to a valve assembly (10) being adapted to detachably receive a dry-break refuelling nozzle (12). The valve assembly comprises a receiver body (14) which defines a forward fuel passageway (16) in which a poppet valve member (18) is slidably mounted. The valve assembly (10) also comprises a tail body (22) secured coaxial with the receiver body (14) and defining a rearward fuel passageway (26). the tail body (22) slidably houses a check valve member or diffuser (28) which is driven by a hydraulic actuator or piston assembly (30).

12 Claims, 5 Drawing Sheets

DRY-BREAK FUEL RECEIVER WITH INTEGRAL BACK-FLOW PREVENTION

FIELD OF THE INVENTION

The present invention relates broadly to a valve assembly such as that used in a dry-break refuelling receiver having integral back-flow prevention.

BACKGROUND OF THE INVENTION

The industry standard method of refuelling large diesel powered equipment in the mining, railway, and earthmoving industries has incorporated dry-break fluid couplings designed to transfer diesel fuel from dispensing point into the fuel tank onboard the equipment. This transfer is often done at relatively high flowrates and within a sealed fuel delivery system. The couplings used to engage the dispensing point with the equipment consist of a female coupling typically at the dispensing point—termed the nozzle—and a male coupling onboard the equipment—termed the receiver. The nozzle typically incorporates a manual operation handle (open/closed), and modern nozzles also incorporate an automatic shut-off mechanism. This automatic mechanism is sensitive to fluid pressure passing through the mating nozzle and receiver, and activates at a preset pressure to automatically close the nozzle and hence terminate the transfer of fuel. This pressure generated in the fuel is typically from the pressurisation of the fuel tank, once it is filled.

Large equipment often incorporate fuel tanks of several thousand litre capacity, and are located on the equipment often several metres from ground level. To facilitate refuelling of the equipment from ground level, the fuel receiver is often situated in a position readily accessible to the refuelling operator and is linked to the fuel tank by a length of fixed pipe and/or flexible hose. Access from ground level has obvious occupational safety and time efficiency benefits.

The mechanical engagement of the nozzle and receiver creates wear between mating surfaces and sealing elements (fluid seals). Nozzles are often routinely removed from active use for the purpose of maintenance to replace damaged or otherwise faulty components. Replacing the receiver installed on equipment is often more difficult, and unless a separate fluid isolation valve exists between the receiver and the tank, the tank must be drained of fuel to a level below the receiver before the receiver can be replaced. This is costly and creates the risk of fuel spillage and subsequent environmental damage.

Drainage of fuel from the fuel tank via the receiver can typically occur in two ways:
(i) The receiver seal is damaged, or the receiver itself suffers impact with another object causing the receiver to fracture; or
(ii) Fuel is pilfered from the tank.

Many thousands of litres of fuel can be lost if no means of back-flow prevention exists between the receiver and the tank.

There are two (2) known fuel receiver products which have an integral back-flow prevention mechanism designed to prevent the drainage of fuel from the tank via the receiver. One such product employs a simple disc style check valve mechanism which is opened by fluid pressure acting directly onto the disc, and is closed by the action of a spring. The front receiver body of the product can be changed out without the need to drain the tank. Another such product is designed so that the second back-flow prevention valve is directly (mechanically) opened by the displacement of the first poppet valve. The principal role of the second valve in this product is to prevent the backflow of fuel during removal (changeout) of the receiver body.

SUMMARY OF THE INVENTION

According to the present invention there is provided a valve assembly comprising:
- a poppet valve housing being adapted to provide releasable coupling for a refilling nozzle and including a forward elongated fluid passageway;
- a poppet valve member slidably mounted within the poppet valve housing for opening and closure of the forward fluid passageway;
- a check valve body connected to the poppet valve housing and including a rearward elongated fluid passageway;
- a check valve member movably coupled to the check valve body for opening and closure of the rearward fluid passageway;
- a hydraulic actuator located within the check valve body and operatively coupled to the check valve member whereby in operation fluid pressure alone acting on the hydraulic actuator effects movement of the check valve member for the opening of the rearward fluid passageway.

Preferably the check valve member is coupled to the check valve body independent of the poppet valve member.

Preferably the hydraulic actuator comprises a piston assembly including a piston housing secured within the check valve body and having a piston chamber, and a piston head slidably mounted within the piston chamber and connected to the check valve member via a piston rod. More preferably the piston assembly also includes piston biasing means urging the check valve member into seated engagement with the piston housing. Even more preferably the piston housing includes a port into the piston chamber and arranged to provide hydraulic fluid pressure against the piston head and the piston biasing means to force opening of the check valve member.

Preferably the valve assembly also comprises a poppet valve body mounted within the poppet valve housing and including a cylindrical bore for guided and sliding movement of the poppet valve member. More preferably the poppet valve body is secured to the piston housing at its forward end. Even more preferably the valve assembly further comprises poppet valve biasing means housed within the cylindrical bore and arranged to urge the poppet valve member into seated engagement with the poppet valve housing for closure of the forward fluid passageway.

Preferably the check valve member is in the form of a generally cylindrical shaped diffuser. More preferably the diffuser is retained for reciprocating movement within the rearward fluid passageway, via a retaining element. Even more preferably the diffuser is guided for reciprocating movement via an annular bearing and adjacent sealing arrangement.

Generally the valve assembly is adapted for use with a dry-break refuelling nozzle.

BRIEF DESCRIPTION OF THE FIGURES

In order to achieve a better understanding of the nature of the present invention a preferred embodiment of a valve assembly will now be described, by way of example only, with reference to the accompanying drawings in which.

DETAILED DESCRIPTION OF THE [INVENTION/PREFERRED EMBODIMENT]

Figure 1:
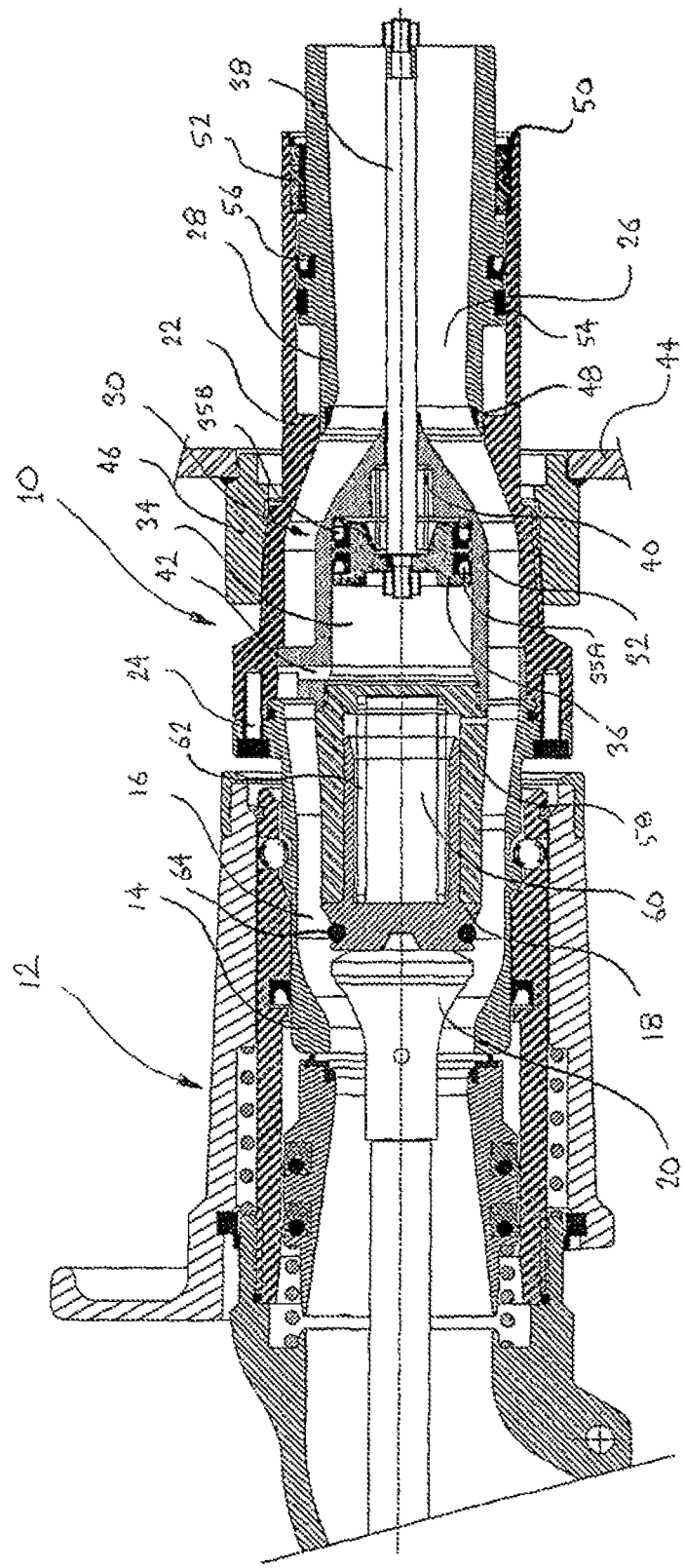
FIGS. 1 and 2 are cross-sectional views of an embodiment of the valve assembly according to the invention together with a refilling nozzle.
Figure 2:
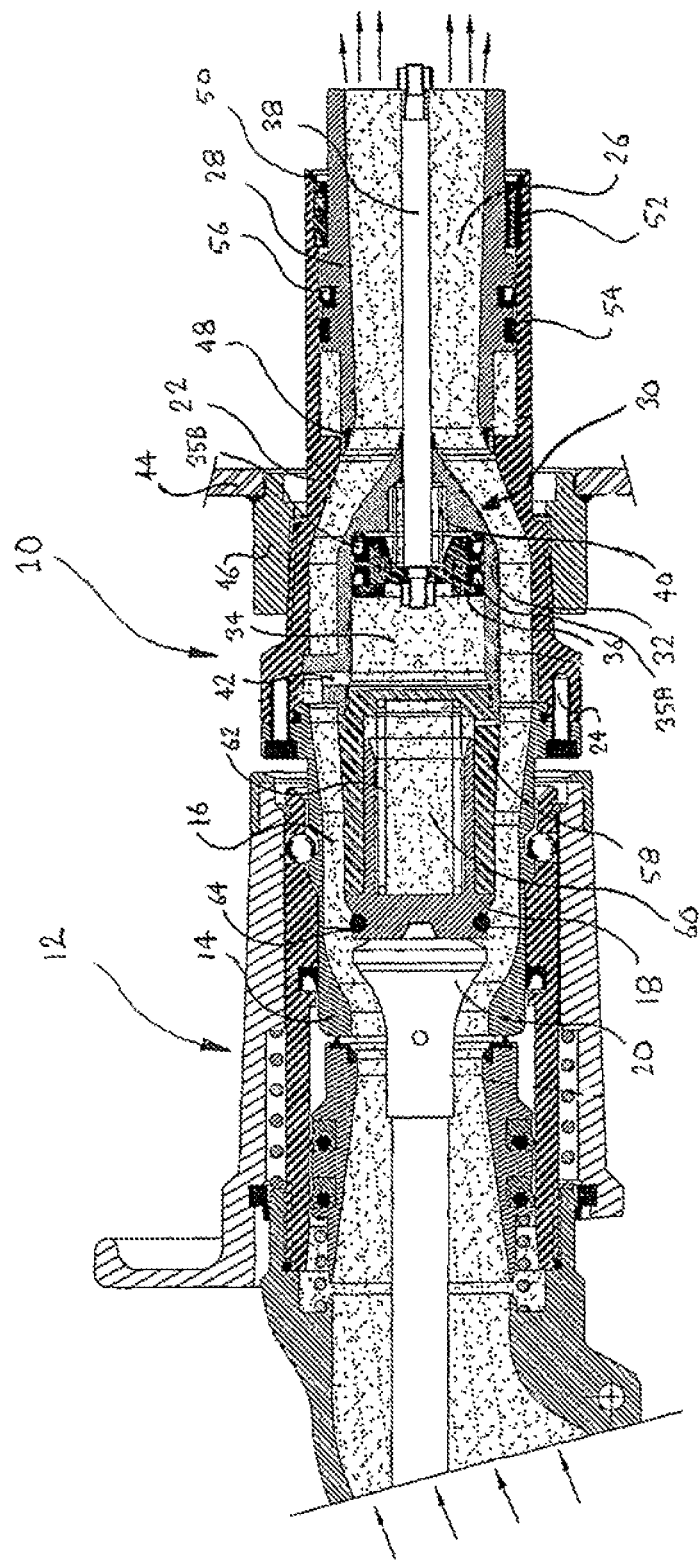

As best shown in FIGS. 1 and 2 there is a valve assembly designated generally as 10 according to one embodiment of the invention and being adapted to receive a re-filling or in this example a refuelling nozzle 12. The refuelling nozzle 12 is of a dry-break configuration such as that described in the applicant's U.S. Pat. No. 4,919,174 the contents of which are included herein by way of reference.

The valve assembly 10 of this embodiment generally comprises the following components:

1. A poppet valve housing or in this example receiver body 14 which provides for latching of the dry-break refuelling nozzle 12 and defines a forward elongated fluid or fuel passageway 16;
2. A poppet valve member 18 slidably mounted within the receiver body 14 and adapted to be urged open by a nozzle poppet 20 of the refuelling nozzle 12;
3. A check valve body or in this example tail body 22 secured coaxial with the receiver body 14 via a series of screw fasteners such as 24 and defining a rearward elongated fuel passageway 26;
4. A check valve member or in this example cylindrical shaped diffuser 28 slidably housed within the tail body 22;
5. A hydraulic actuator designated generally as 30 located within the tail body 22 and operatively coupled to the diffuser 28 for opening and closure of the rearward fuel passageway 26.

The hydraulic actuator of this embodiment is in the form of a piston assembly 30 including a piston housing 32 securely mounted at an upstream end of the rearward fuel passageway 26. The piston housing defines a piston chamber 34 within which a piston head 36 is slidably mounted. The piston head 36 is connected to the diffuser 28 via a piston connecting rod 38.

The piston assembly 30 of this embodiment includes a pair of piston seals 35A and 35B. The seals 35A and 35B each provide sealing by fluid pressure in both directions, that is the seals 35A and 35B provide a double-acting role. The forward seal 35A retains fluid pressure against the piston head 36 within the forward side of the chamber 34 whilst the rearward seal 35B provides a seal against fluid pressure entering into the forward side of the chamber 34, such as from the fuel tank. The pair of back to back seals 35A and 35B are in the form of U-seals designed to achieve low friction to achieve relatively free travel of the piston 36 within the chamber 34. The pair of seals 35A and 35B could be replaced by a single double-acting piston seal.

The piston assembly 30 also includes biasing means in the form of a compression spring 40 located within the piston chamber 34 about the piston connecting rod 38. The piston spring 40 urges the piston head 36 together with the piston connecting rod 38 and diffuser 28 in a forward direction. Importantly, the piston housing 32 includes a piston chamber port 42 to the piston chamber 34 and arranged to provide hydraulic fluid pressure against the piston head 36 and the biasing force of the spring 40 to force opening of the diffuser 28.

FIGS. 1 and 2 otherwise illustrate connection of the valve assembly 10 to a fuel tank such as 44 having a receiver socket 46 to which the valve assembly 10 or tail body 22 is screw threaded. The valve assembly 10 of these figures shows both the poppet valve member 18 and the check valve member or diffuser 28 in their open conditions. For ease of reference and in order to avoid repetition, like components of the assembly 10 of FIG. 2 have been designated with the same reference numeral as the corresponding components of FIG. 1.

Figure 3:
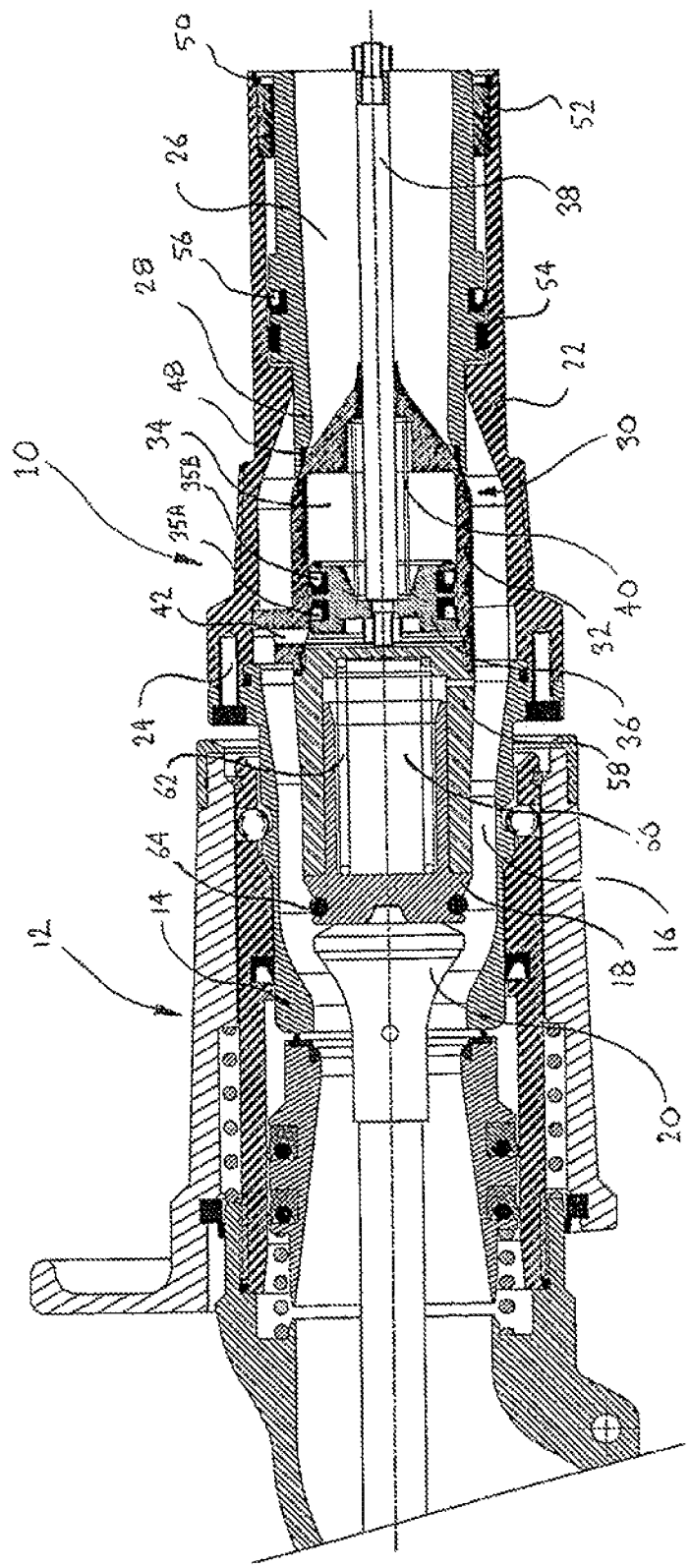
FIGS. 3 and 4 are cross-sectional views of the valve assembly of FIGS. 1 and 2 with and without a refilling nozzle respectively.
Figure 4:
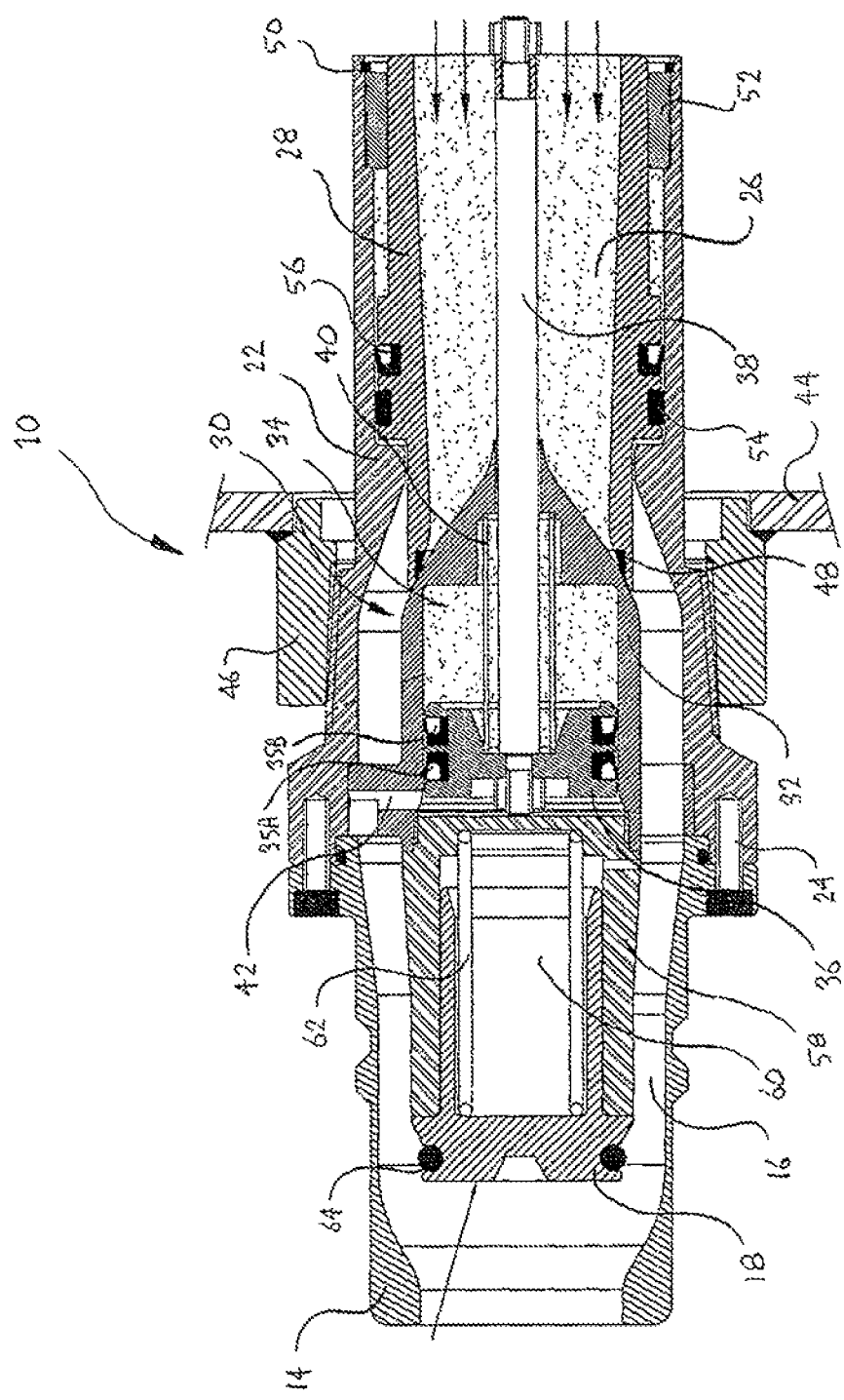

FIGS. 3 and 4 illustrate the valve assembly 10 of the previous embodiment but with the check valve member or in this case diffuser 28 shown in its closed condition. The valve assembly 10 is otherwise identical in construction to the previous embodiment and corresponding components have been referenced with the same numeral.

The valve assembly 10 of FIGS. 3 and 4 shows the poppet valve member 18 in its open condition under the cooperating force of the nozzle poppet 20 or some other means. However, in this case depressurisation of the fuel or diesel supply means the fluid pressure force acting within the piston chamber 34 is less than the counter-force of the piston spring 40 which urges the piston 36 together with the check valve member or diffuser 28 into its closed conditions. That is, despite the poppet valve 18 at the forward fluid passageway 16 being opened, the discharge of fuel from the tank 44 is prevented by the check valve member or diffuser 28 being closed.

As shown in FIGS. 3 and 4 the piston housing 32 is at a downstream end shaped conically and designed to engage or seat with the check valve member or diffuser 28. The diffuser 28 includes a tapered edge at its upstream end which is designed to house a face seal 48 which prevents fluid flow in a reverse direction. In an alternate embodiment the seal 48 may be affixed onto the conical surface of piston housing 32 where it engages the mating tapered face of the diffuser 28.

Figure 5:
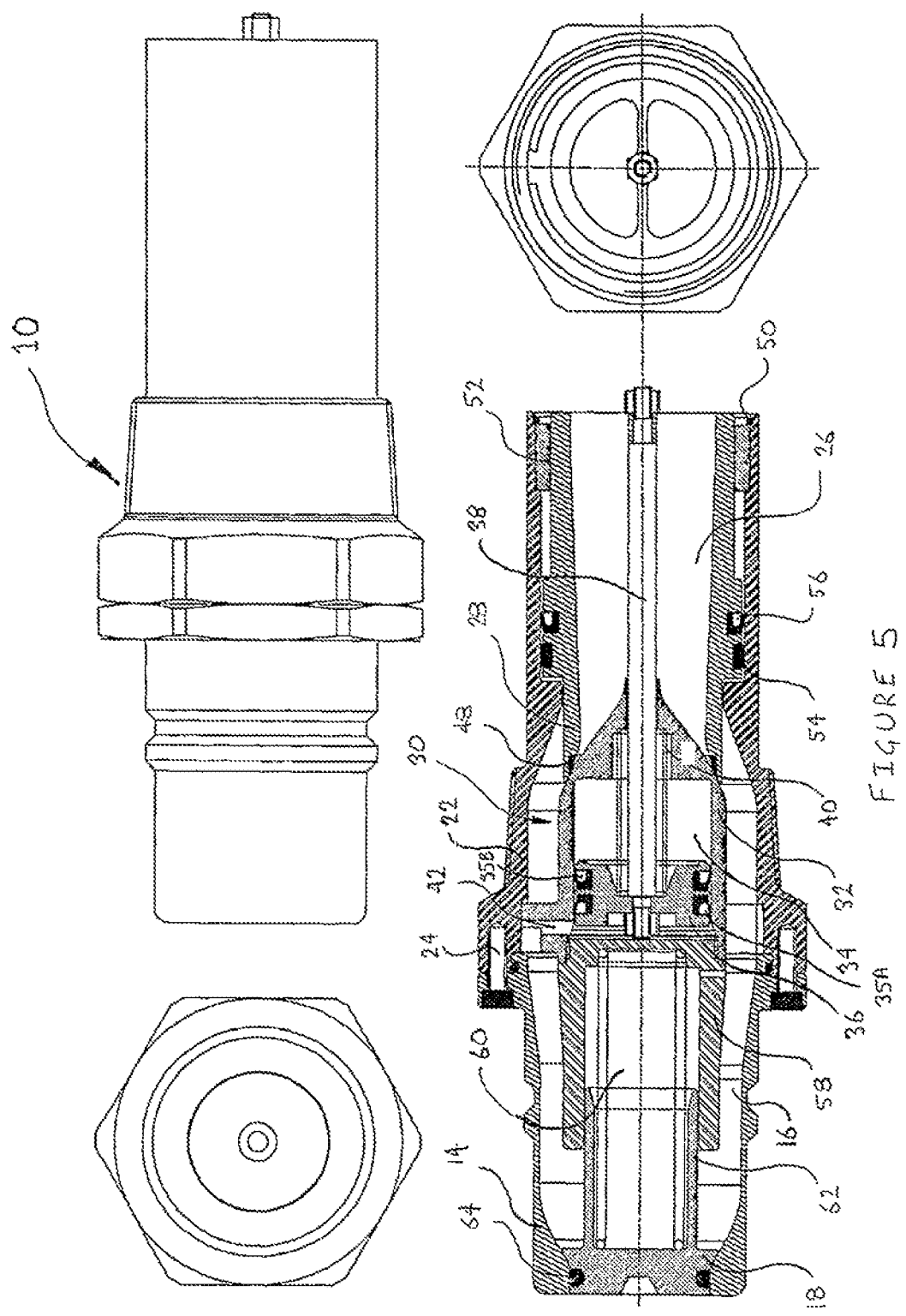
FIG. 5 is a cross-sectional view of the preceding figures together with plan and elevational views.

As best shown in FIG. 5 the check valve member or diffuser 28 is arranged for reciprocating movement within the rearward fluid or fuel passageway 26. The diffuser 28 is retained within the check valve body or tail body 22 via a retaining ring 50 and diffuser sleeve 52. The diffuser 28 is guided for reciprocating movement via an annular bearing 54 together with an adjacent diffuser U-seal 56.

The valve assembly 10 of FIG. 5 is shown with both the poppet valve member 18 and the check valve member 28 in their closed conditions. The poppet 18 is slidably housed within a poppet valve body 58 which in this example is connected to the piston housing 32. The poppet valve body 58 includes a cylindrical bore 60 which provides guided reciprocating movement of the poppet 18. The poppet 18 is urged into its closed condition via poppet biasing means in the form of a compression spring 62 located within the cylindrical bore 60. The poppet 18 includes an annular O-ring 64 which seats with an inner surface of the receiver body 14 on closure of the poppet 18.

The general steps involved in operation of the valve assembly 10 of this embodiment are as follows:

1. The refilling or dry-break refuelling nozzle 12 is detachably connected or latched onto the receiver body 14 of the valve assembly 10;
2. The refuelling nozzle 12 is manually opened forcing the nozzle poppet 20 into engagement with the poppet valve member 18 unseating it from the receiver body 14 against the biasing force of the poppet spring 62;

3. The poppet valve member 18 is thus opened allowing fluid to flow through the forward fuel passageway 16 and into the piston chamber 34 via the piston housing port 42;
4. The hydraulic fluid pressure of the fluid or fuel in the piston chamber 34 urges the piston head 36 in a rearward direction against the biasing force of the piston spring 40;
5. The piston head 36 drives the check valve member or diffuser 28 to a rearward position via the action of the piston rod 38;
6. The check valve member or diffuser 28 is thus opened allowing fuel to flow from the forward fluid passageway 16 to the rearward fluid passageway 26 to the fuel tank 44;
7. The refuelling nozzle 12 is either manually or automatically shut off allowing the poppet valve member 18 to return to its closed condition preventing the flow of fuel to the valve assembly 10;
8. The resultant pressure drop of fuel within the piston chamber 34 means that the piston head 36 (as urged by the spring 40) together with the associated diffuser 28 returns to a forward position for closure of the rearward fluid passageway 26, regardless of whether the front poppet 18 is opened by a nozzle or any other means.

Importantly, and as best shown in FIG. 4, if the poppet valve member 18 is depressed open the check valve member 28 will not open unless sufficient fluid pressure is provided within the piston chamber 34. This means that fuel cannot be drained from the tank unless the check valve member 28 is hydraulically actuated. This will be the case whether or not the nozzle 12 is connected and turned ON. This particular design of the valve assembly 10 also prevents manual overriding of this hydraulic actuation insofar as the piston 36 itself and the check valve member or diffuser 28 are effectively inaccessible.

Now that a preferred embodiment of the present invention has been described in some detail it will be apparent to those skilled in the art that the valve assembly has the following advantages:
1. The valve assembly and in particular the check valve which is hydraulically actuated provides no real means of being overridden and thus protects against pilferage of fuel from a tank;
2. The check valve provides a minimal increase in pressure drop which means that the need or temptation for manual overriding of automatic shut-off is not increased where it could otherwise lead to overfilling and create environmental damage, wastage of fuel and possibly structural damage or rupturing of tanks;
3. The valve assembly cannot be forcibly overridden because there is no mechanical link between the poppet valve member and check valve member which is a feature of at least one example of the prior art;
4. The valve assembly has the check valve member "protected" and therefore cannot be overridden by forcing a stiff wire or other element through the open receiver poppet and against the disc style check valve of the prior art; and
5. The valve assembly provides both a poppet valve and check valve each being conveniently in a normally closed state.

Those skilled in the art will appreciate that the invention described herein is susceptible to variations and modifications other than those specifically described. For example, the hydraulic actuator may vary from the piston assembly described provided it is effectively hydraulically operated and addresses the problems identified by the invention. The hydraulic actuator and/or check valve could be mounted remote from or downstream of the poppet valve member. The check valve member need not be of the diffuser-type provided it effectively provides for opening and closure of the rearward fluid passageway. Although the embodiment described has been installed directly into a tank, the axial discharge of fuel from the check valve lends itself to mounting to a length of pipe or the like. All such variations and modifications are to be considered within the scope of the present invention and nature of which is to be determined from the foregoing description.

The invention claimed is:
1. A valve assembly comprising:
   a poppet valve housing being adapted to provide releasable coupling for a refilling nozzle and including a forward elongated fluid passageway;
   a poppet valve member slidably mounted within the poppet valve housing for opening and closure of the forward fluid passageway;
   a check valve body connected to the poppet valve housing and including a rearward elongated fluid passageway;
   a check valve member movably coupled to the check valve body for opening and closure of the rearward fluid passageway;
   a hydraulic actuator located within the check valve body and operatively coupled to the check valve member whereby in operation fluid pressure alone acting on the hydraulic actuator effects movement of the check valve member for the opening of the rearward fluid passageway.
2. The valve assembly as defined in claim 1 wherein the check valve member is coupled to the check valve body independent of the poppet valve member.
3. The valve assembly as defined in claim 1 wherein the hydraulic actuator comprises a piston assembly including a piston housing secured within the check valve body and having a piston chamber, and a piston head slidably mounted within the piston chamber and connected to the check valve member via a piston rod.
4. The valve assembly as defined in claim 3 wherein the piston assembly also includes piston biasing means urging the check valve member into seated engagement with the piston housing.
5. The valve assembly as defined in claim 4 wherein the piston housing includes a port into the piston chamber and arranged to provide hydraulic fluid pressure against the piston head and the piston biasing means to force opening of the check valve member.
6. The valve assembly as defined in claim 1 also comprising a poppet valve body mounted within the poppet valve housing and including a cylindrical bore for guided and sliding movement of the poppet valve member.
7. The valve assembly as defined in claim 6 wherein the poppet valve body is secured to the piston housing at its forward end.
8. The valve assembly as defined in claim 6 further comprising poppet valve biasing means housed within the cylindrical bore and arranged to urge the poppet valve member into seated engagement with the poppet valve housing for closure of the forward fluid passageway.
9. The valve assembly as defined in claim 1 wherein the check valve member is in the form of a generally cylindrical shaped diffuser.
10. The valve assembly as defined in claim 9 wherein the diffuser is retained for reciprocating movement within the rearward fluid passageway, via a retaining element.
11. The valve assembly as defined in claim 10 wherein the diffuser is guided for reciprocating movement via an annular bearing and adjacent sealing arrangement.

12. The valve assembly as defined in claim 1 wherein the valve assembly is adapted for use with a dry-break refueling nozzle.

* * * * *